(No Model.) 5 Sheets—Sheet 2.
W. P. QUENTELL.
CAN SOLDERING MACHINE.
No. 471,360. Patented Mar. 22, 1892.
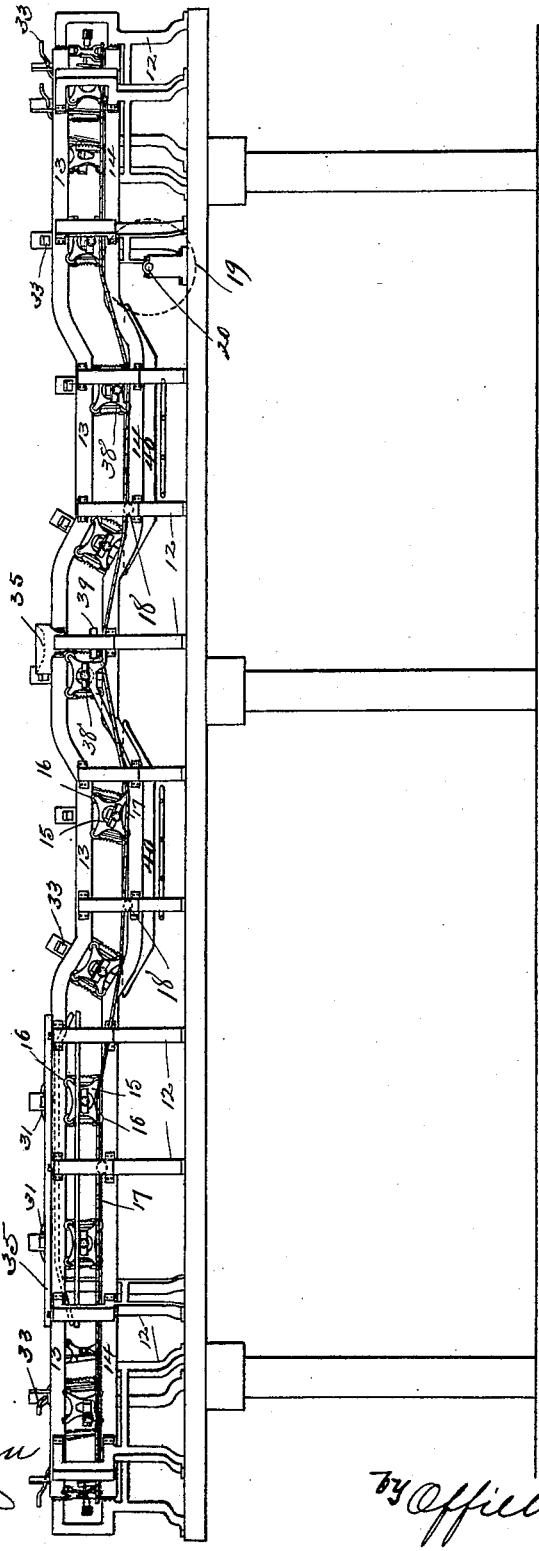

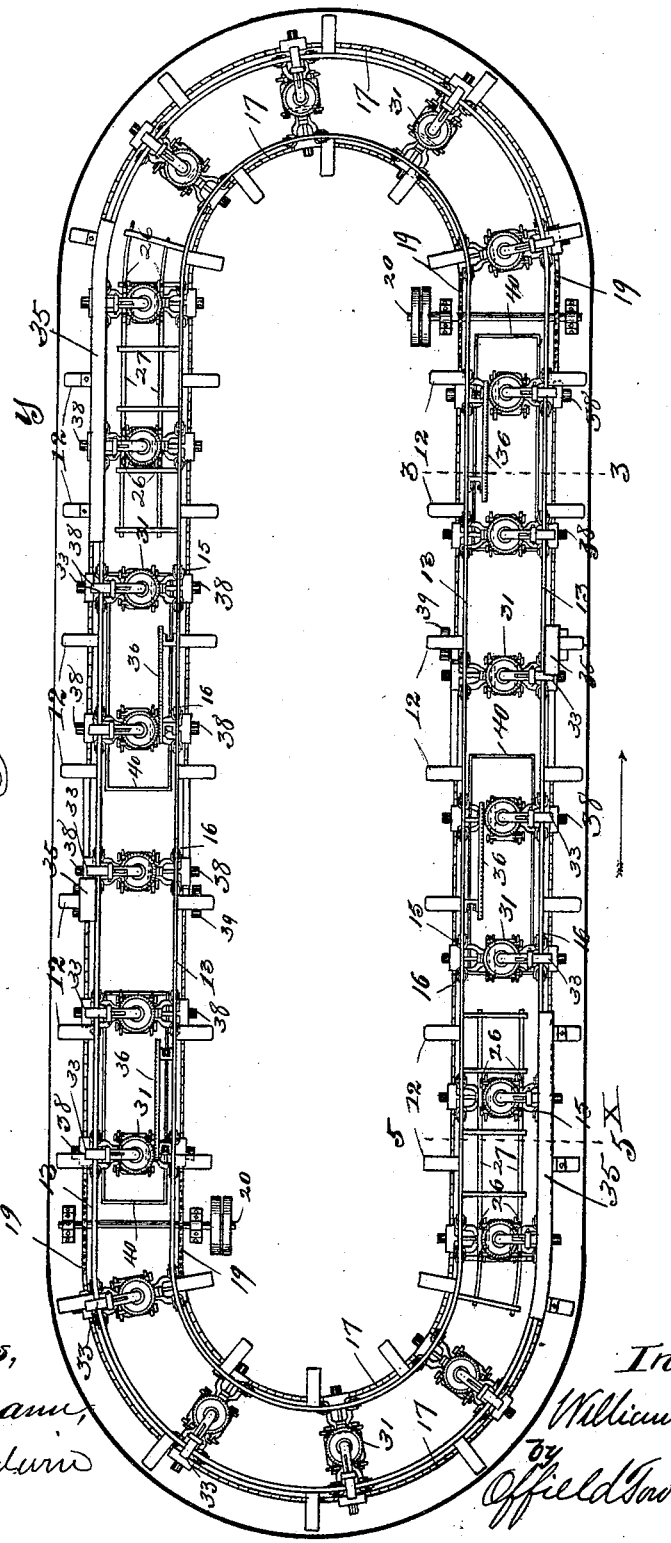

(No Model.) 5 Sheets—Sheet 3.
W. P. QUENTELL.
CAN SOLDERING MACHINE.
No. 471,360. Patented Mar. 22, 1892.
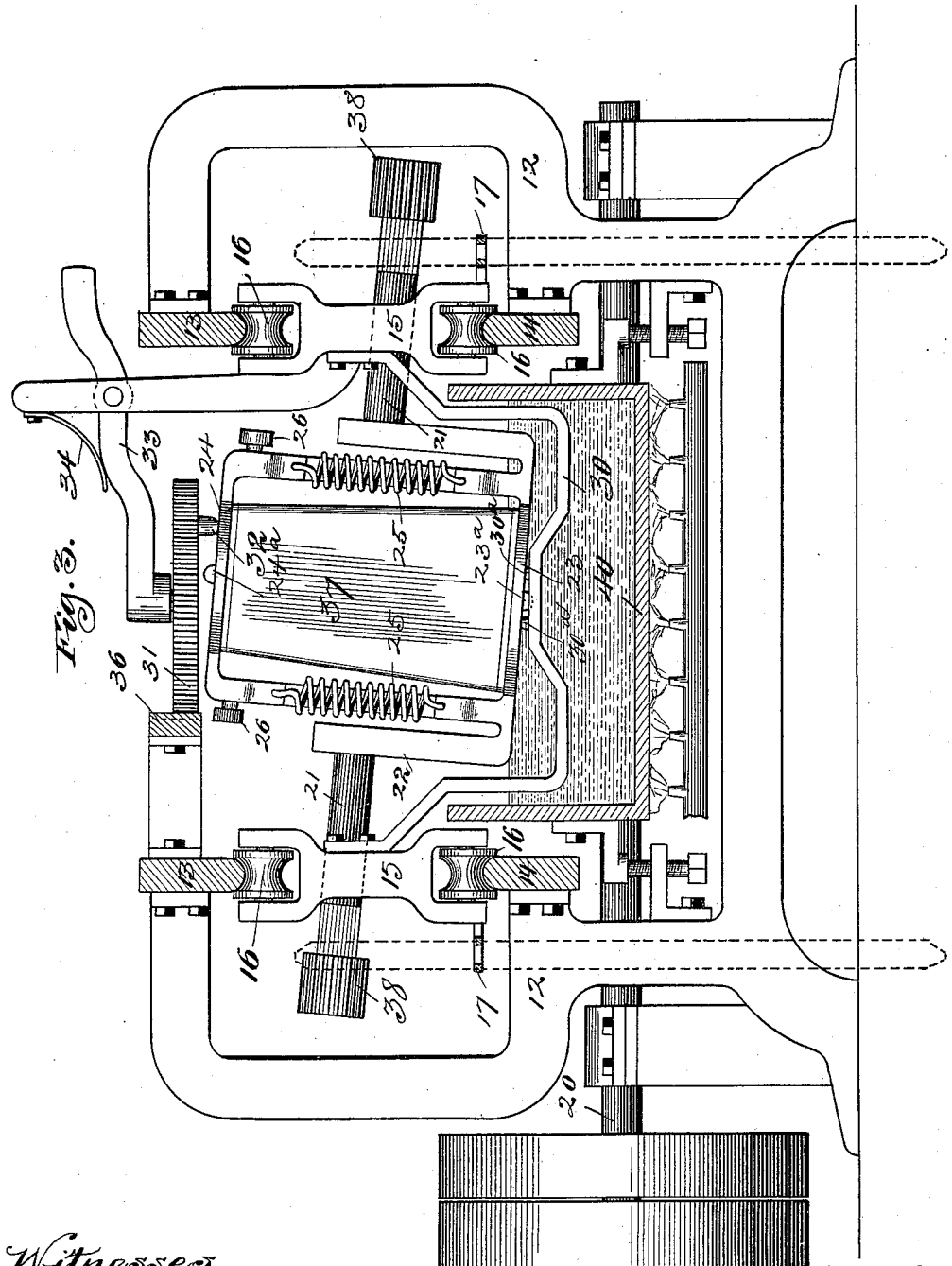

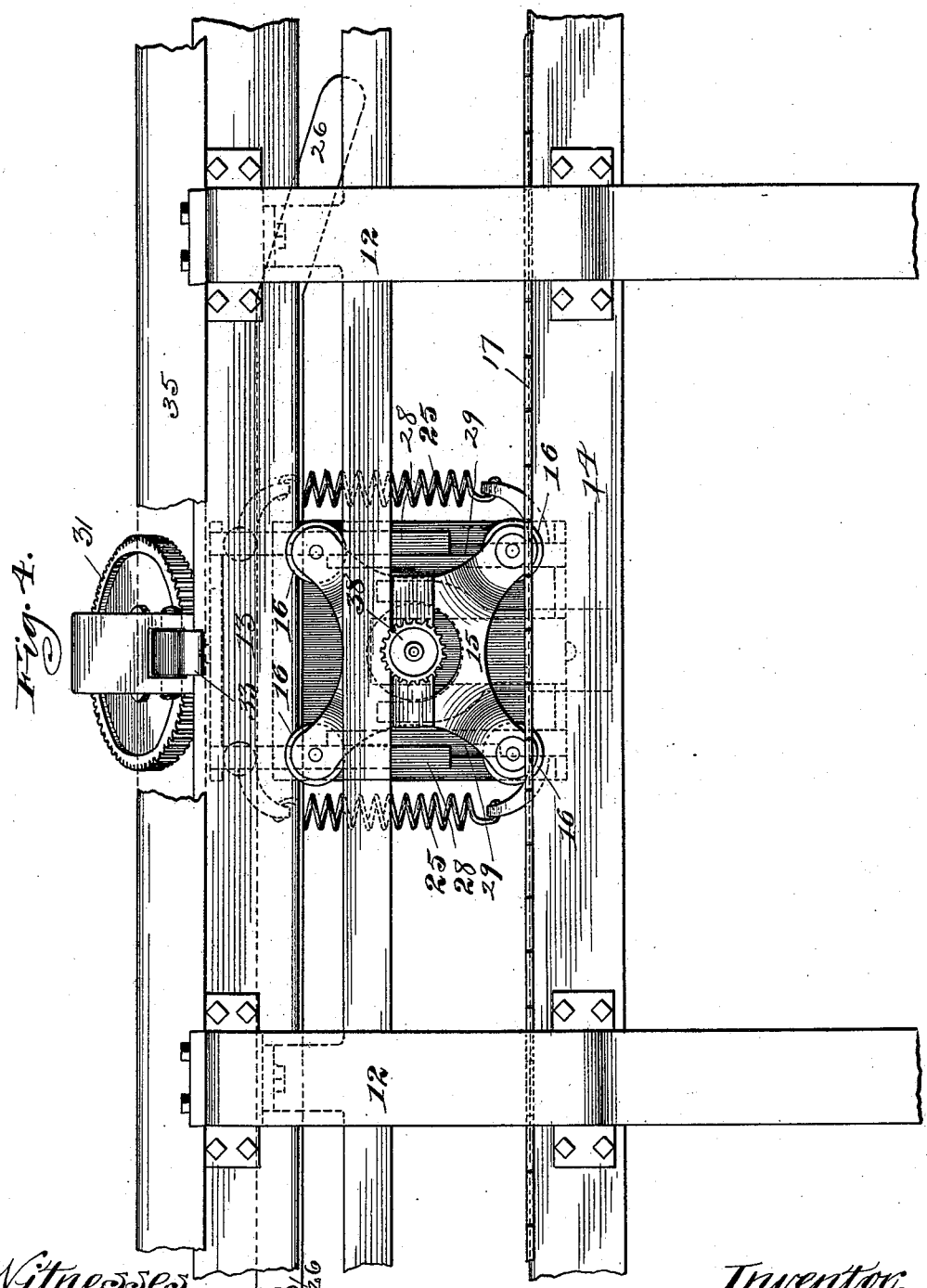

(No Model.) 5 Sheets—Sheet 5.
W. P. QUENTELL.
CAN SOLDERING MACHINE.
No. 471,360. Patented Mar. 22, 1892.
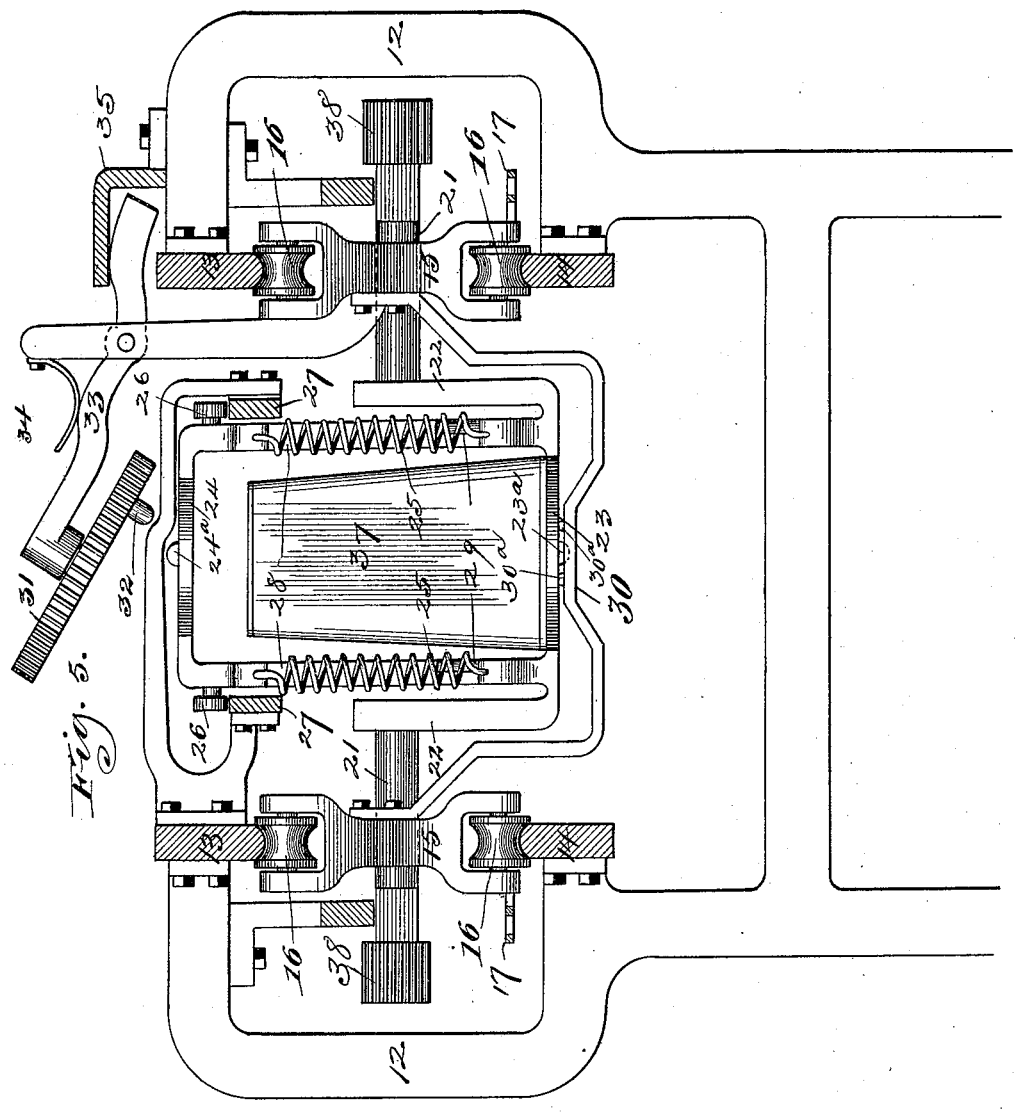
Witnesses,
Inventor,
William P. Quentell
By Offield, Towle & Linthicum
Atty's

UNITED STATES PATENT OFFICE.

WILLIAM P. QUENTELL, OF KANSAS CITY, MISSOURI.

CAN-SOLDERING MACHINE.

SPECIFICATION forming part of Letters Patent No. 471,360, dated March 22, 1892.

Application filed October 31, 1891. Serial No. 410,530. (No model.)

*To all whom it may concern:*

Be it known that I, WILLIAM P. QUENTELL, a citizen of the United States, residing at Kansas City, in the county of Jackson and State of Missouri, have invented certain new and useful Improvements in Can-Soldering Machines, of which the following is a specification.

My invention relates to that class of apparatus for soldering the heads upon the bodies of sheet-metal cans wherein the can is clamped between supports movable to and from each other and which supports are rocked in order to bring the entire circumference of the edge of the can into contact with the solder. This rocking is commonly done by the hand of the attendant; but in my apparatus the rocking is performed automatically.

I have illustrated my invention in connection with certain novel mechanisms which are made the subject-matter of a companion application filed of even date herewith, Serial No. 410,529.

In the apparatus described in this and said companion application I employ a suitable frame-work supporting an endless track, carriers moving upon said track, can-supports journaled in said carriers, so that they may be rocked or rotated in order to bring the ends of the can successively into position for the application of the solder, means for separating the supports or clamps, means for moving the carriers, and means for reversing the position of the cans, these several mechanisms being automatic in their operation.

In the improvement herein described and claimed I employ, in addition to said revoluble carrier, a pivoted support for the can and means for rocking said support upon its pivot, so that the edge of the can only is dipped into the solder. This rocking means comprises a rotating disk or gear having a lug or stud thereon adapted to travel in contact with one of the can-supports eccentric to the pivotal axis of said support, and means for revolving said disk, comprising a rack placed at the proper position along the track and enmeshing with gear-teeth on the edge of said disk. The disk is preferably hung upon a pivoted arm, and at suitable intervals, where the supports are to be separated for the removal or insertion of a can, a supplemental track is provided, which is adapted to support said pivoted arm and its suspended disk while the can is being reversed or removed and replaced.

In the accompanying drawings, Figure 1 is a plan view of the apparatus. Fig. 2 is a side elevation thereof. Fig. 3 is a cross-section on the line 3 3 of Fig. 1. Fig. 4 is an enlarged detail view, in side elevation, showing a carriage and a section of the tracks. Fig. 5 is a section on line 5 5 of Fig. 1.

In the drawings, 12 represents the supporting frame-work, which carries the upper track-rails 13 and lower track-rails 14.

15 represents the frame of a carriage, having travelers 16 at the corners, which travelers roll upon the upper and lower track-rails respectively. The carriage is moved by means of an endless chain 17, connected thereto, which chain is carried over idlers 18 and driven by gears 19 on a driving-shaft 20. The carriages have journaled therein the studs 21, which bear yokes 22, said yokes being enlarged between their stems to provide supports 23 24. The arms or yokes of the supports are yieldingly connected by means of the springs 25, and the yokes of the support 24 carry travelers 26, which are adapted to travel upon track-sections 27, stationed at suitable intervals for the purpose of separating the supports to permit the release of a finished can and the insertion of a new can.

28 29 represent guides affixed, respectively, to the upper and lower supports or to the yokes bearing them, said guides serving to prevent the lateral movement of the cups with reference to each other.

30 represents a bracket or cross-bar secured to the frame of the carriage and having a seat therein to receive the studs 23ª 24ª, projecting from the supports 23 24. These studs form the pivots of the can-supports. In order to rock said supports upon their pivots, I employ a spur-gear 31, having an eccentric stud or pin 32 on its lower side and supported upon the pivoted bar 33, which may be normally depressed by the spring 34 and sustained in an elevated position during the time the can is being placed, reversed, or removed by means of the supplemental track-rails 35, with which the outer end of the bar 33 is admitted to engage. Racks 36 are stationed at proper intervals along the track to engage the gear 31 and revolve it. As it revolves its stud 32 travels upon the can-support presented thereto, and thereby tilts or rocks the can and its support, so as to bring the edge of the can into contact with the solder.

The can 37 shown in the drawings is of the so-called "square" type as distinguished from the ordinary round can; but while it is substantially a parallelogram in cross-section through its body its ends are parallel, while its sides flare, thus giving it a pyramidal appearance. If the can were square or round, its entire edge would be dipped to a uniform depth by the provisions above described; but because of its peculiar shape additional provisions must be made for limiting the rocking movement of the can-support, so as to secure this uniform depth of immersion in the solder. These provisions comprise stops 30ª, arranged concentric to the seat for the studs or pivots of the can-supports and operating to limit the rocking movement of said supports. Now as the end walls of the can are farther from the pivotal center than the side walls when the can is tipped or rocked, so that the edge of the end wall is immersed in the solder, the tipping mechanism must have a vertical adjustment, and therefore I employ the pivoted bar 33 and the spring 34, which permits the disk 31 and its stud to move upwardly sufficient to accommodate this variation. In order to accommodate this rocking or tipping movement of the can-supports, the bearings on their axis must be elongated. Said axles bear upon their outer ends pinions 38, and these pinions engage racks 39, placed at suitable intervals along the track to cause the reversal of the can.

40 represent solder-wells, in which liquid solder will be placed and maintained at such level as will permit the immersion of the edge of the can therein. The tracks for the carriages will be of such configuration that the carriages will move down to cause the can to enter the solder-well and to lift the carriers and raise the can out of the solder-well.

I have described the part 31 as a spur-gear; but obviously such part might be a disk or wheel driven by friction with a smooth-faced rack instead of the rack 36, and by the word "gear" I mean to include such or any equivalent construction.

Without limiting my invention to the precise construction and arrangement of parts, I claim—

1. In a can-soldering apparatus, the combination, with a track, of carriers adapted to travel upon said track, can-supports pivotally mounted upon said travelers, and a revoluble gear moving with the carrier and adapted to bear eccentrically upon one of the can-supports, whereby to tip or rock the can to present its edge to the solder, substantially as described.

2. In a can-soldering apparatus, the combination, with a track, of a carrier moving upon said track, can-supports pivotally mounted upon said carrier, a revoluble gear also mounted upon the carrier and having gear-teeth upon its periphery, an eccentric stud or pin adapted to bear upon the can-support, and racks located along the track and adapted to enmesh with the teeth of the disk, whereby to revolve the same, substantially as described.

3. In an apparatus for soldering cans of irregular form, the combination, with a track, of a carrier moving on said track, can-supports pivotally mounted upon said carrier, a revoluble gear also mounted upon the carrier and bearing eccentrically upon the can-support, whereby to rock or tip said support, and stops to limit said rocking movement.

4. In an apparatus for soldering cans of irregular form, the combination, with a track, of a carrier moving on said track, can-supports pivotally mounted upon said carrier, a revoluble gear also mounted upon the carrier and having an eccentric bearing upon the can-support, whereby to rock the same, and stops to limit said rocking movement, said rocking mechanism being vertically movable, substantially as and for the purpose described.

WILLIAM P. QUENTELL.

Witnesses:
C. C. LINTHICUM,
FREDERICK C. GOODWIN.